United States Patent
Hu et al.

(10) Patent No.: US 8,918,066 B2
(45) Date of Patent: Dec. 23, 2014

(54) FACILITATING SWITCHING BETWEEN TRANSMITTING ANTENNAS IN PORTABLE ELECTRONIC DEVICES

(75) Inventors: Ming Hu, Sunnyvale, CA (US); Haining Zhang, San Jose, CA (US); Xueting Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 13/597,771

(22) Filed: Aug. 29, 2012

(65) Prior Publication Data

US 2013/0331044 A1    Dec. 12, 2013

Related U.S. Application Data

(60) Provisional application No. 61/657,528, filed on Jun. 8, 2012.

(51) Int. Cl.
*H03C 7/02* (2006.01)
*H04B 7/00* (2006.01)

(52) U.S. Cl.
USPC .......................................... 455/101; 375/299

(58) Field of Classification Search
USPC .......................................... 455/101; 375/299
See application file for complete search history.

(56) References Cited

U.S. PATENT DOCUMENTS

| | | | |
|---|---|---|---|
| 6,473,600 B1 * | 10/2002 | Dvorkin ......................... | 455/129 |
| 7,174,138 B2 | 2/2007 | Webster et al. | |
| 2008/0227415 A1 * | 9/2008 | Harel et al. .................... | 455/101 |
| 2012/0062424 A1 | 3/2012 | Hwang | |
| 2013/0095869 A1 * | 4/2013 | Christoffersson et al. .... | 455/501 |

* cited by examiner

*Primary Examiner* — Lee Nguyen
(74) *Attorney, Agent, or Firm* — Park, Vaughan, Fleming & Dowler LLP; Chia-Hsin Suen

(57) ABSTRACT

The disclosed embodiments provide a system that uses a first antenna and a second antenna in a portable electronic device. During operation, the system receives a request to switch from the first antenna to the second antenna to transmit a signal to a cellular receiver. Next, the system loads a set of radio-frequency (RF) calibration values for the second antenna. Finally, the system performs the switch from the first antenna to the second antenna to transmit the signal, wherein the second antenna is operated using the RF calibration values after the switch.

25 Claims, 4 Drawing Sheets

FACILITATING SWITCHING BETWEEN TRANSMITTING ANTENNAS IN PORTABLE ELECTRONIC DEVICES

RELATED APPLICATION

This application claims the benefit of U.S. Provisional Application No. 61/657,528, entitled "Facilitating Switching between Transmitting Antennas in Portable Electronic Devices," by inventors Ming Hu, Haining Zhang and Xueting Liu, filed 8 Jun. 2012.

BACKGROUND

1. Field

The disclosed embodiments relate to antennas in portable electronic devices. More specifically, the disclosed embodiments relate to techniques for facilitating switches between transmitting antennas in portable electronic devices.

2. Related Art

Recent improvements in computing power and wireless networking technology have significantly increased the capabilities of portable electronic devices. For example, laptop computers, tablet computers, portable media players, smartphones, and/or other modern computing devices are typically equipped with wireless and/or cellular networking capabilities that allow the computing devices to retrieve webpages, stream audio and/or video, share desktops and/or user interfaces (UIs), and/or transfer files wirelessly among one another.

However, network and/or cellular connectivity from a portable electronic device may be affected by the external environment of the portable electronic device. For example, cellular reception on a mobile phone may vary based on the proximity of a cellular tower to the mobile phone, obstructions between the mobile phone and the cell site, connections between other mobile phones and the cellular tower, and/or weather conditions near the mobile phone and/or cellular tower. In turn, fluctuations in cellular reception on the mobile phone may result in dropped calls, slow connections, and/or other adverse effects.

Consequently, use of portable electronic devices with cellular networking capabilities may be facilitated by techniques for improving the transmission and reception of signals between the portable electronic devices and cellular networks to which the portable electronic devices are connected.

SUMMARY

The disclosed embodiments provide a system that uses a first antenna and a second antenna in a portable electronic device. During operation, the system receives a request to switch from the first antenna to the second antenna to transmit a signal to a cellular receiver. Next, the system loads a set of radio-frequency (RF) calibration values for the second antenna. Finally, the system performs the switch from the first antenna to the second antenna to transmit the signal, wherein the second antenna is operated using the RF calibration values after the switch.

In some embodiments, the system also sets a maximum power for the second antenna, wherein the second antenna is further operated using the maximum power after the switch.

In some embodiments, the maximum power is set based on at least one of:

(i) a regulatory requirement for the second antenna;
(ii) an operation of a third antenna in the portable electronic device;
(iii) a temperature of the portable electronic device; and
(iv) a proximity of a user to the second antenna.

In some embodiments, the system also turns off a transmitter for the first and second antennas prior to performing the switch, and turns on the transmitter after the switch is performed.

In some embodiments, the set of RF calibration values includes at least one of a frequency offset, a transmitter gain index versus power, and a power detector value versus power.

In some embodiments, the first and second antennas include a primary antenna and a secondary antenna.

In some embodiments, the portable electronic device is at least one of a mobile phone and a tablet computer.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
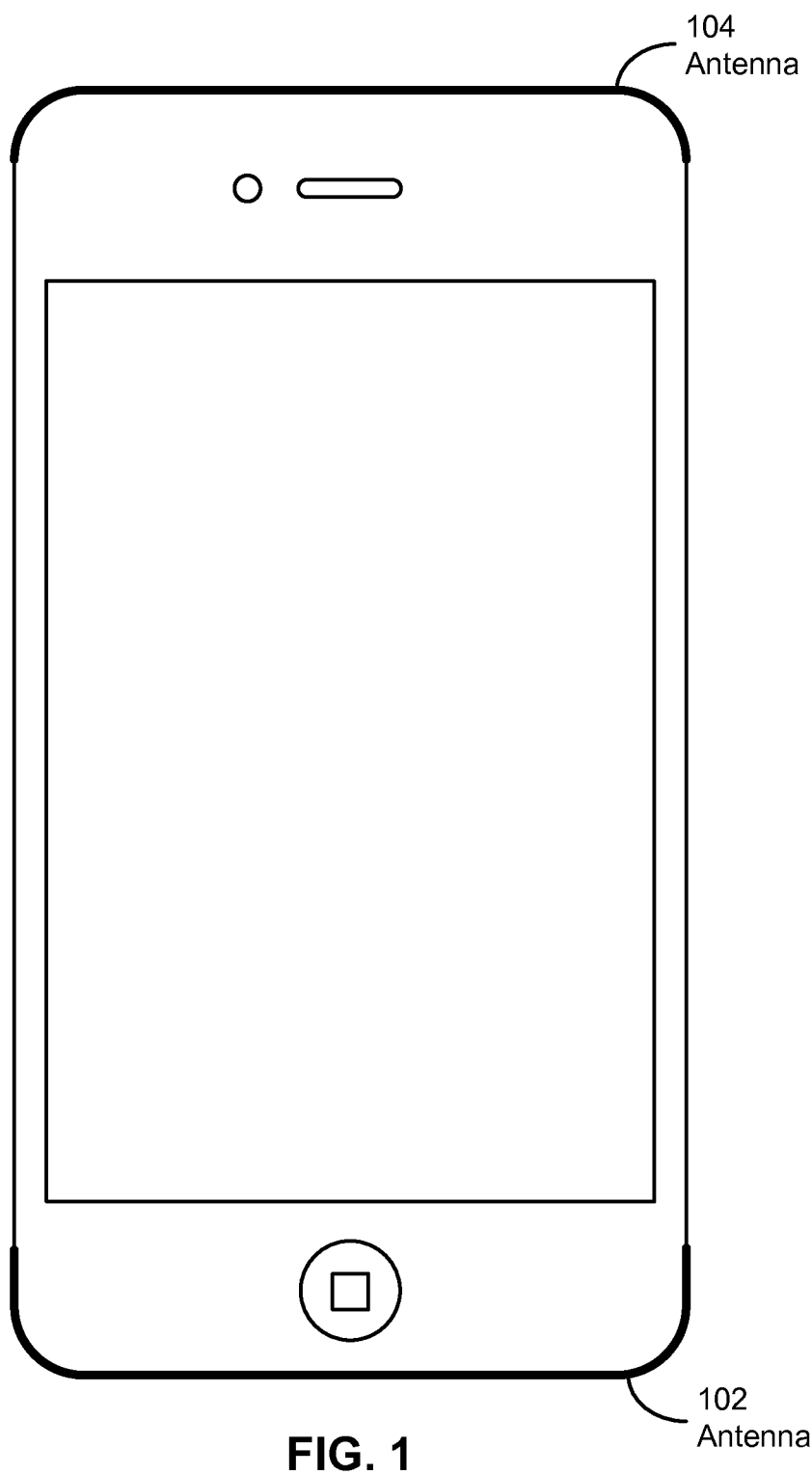
FIG. 1 shows a set of antennas in a portable electronic device in accordance with the disclosed embodiments.

The disclosed embodiments provide a method and system for facilitating the use of antennas on portable electronic devices such as mobile phones, tablet computers, portable media players, and/or other electronic devices with cellular networking functionality. As shown in FIG. 1, a portable electronic device may include an antenna 102 around the bottom of the portable electronic device and another antenna 104 around the top of the portable electronic device.

Antennas 102-104 may function as primary and secondary antennas, respectively, for communicating with a cellular tower to which the portable electronic device is connected. For example, antenna 102 may be used to transmit cellular signals to the cellular tower until a change in the external environment of antenna 102 (e.g., an obstruction) causes the efficiency of antenna 102 to drop. A switch from using antenna 102 to antenna 104 to transmit the cellular signals may then be made to mitigate degradation in the cellular connectivity of the portable electronic device and/or reduce the amount of power used to transmit the cellular signals.

However, differences in the sizes and/or radio-frequency (RF) characteristics of antennas 102-104 may require antennas 102-104 to be operated differently from one another during transmission of signals from the portable electronic device. For example, a regulatory limit for the maximum power at which the larger, primary antenna 102 may be operated may be higher than the regulatory limit for the maximum power at which the smaller, secondary antenna 104 may be operated.

Figure 2:
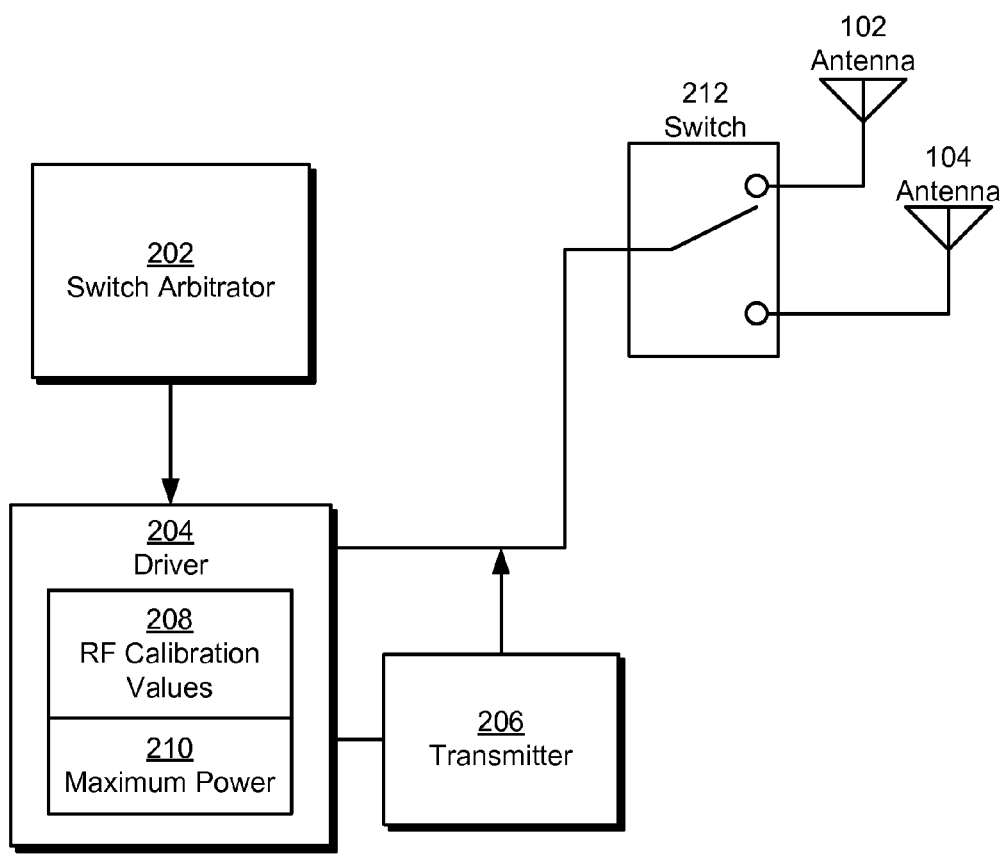
FIG. 2 shows a system for using a first antenna and a second antenna in a portable electronic device in accordance with the disclosed embodiments.

In turn, the portable electronic device may be required to account for such differences in the operations of antennas 102-104 during switches between antennas 102-104 to transmit signals to the cellular tower. As shown in FIG. 2, a switch arbitrator 202 in the portable electronic device may decide to switch between antennas 102-104 based on the external environment of the portable electronic device and/or other factors affecting the cellular connectivity of the portable electronic device.

Once a decision is made to switch from a first antenna to a second antenna to transmit a signal to a cellular receiver, switch arbitrator 202 may send a request to switch to a driver 204 on the portable electronic device. For example, switch arbitrator 202 may be provided by the physical layer (e.g., layer 1) of a network stack in the portable electronic device and communicate with driver 204 for a baseband processor in the portable electronic device.

Upon receiving the request, driver 204 may execute a sequence of steps to perform and/or manage the switch. First, driver 204 may turn off a transmitter 206 for antennas 102-104 prior to performing the switch to prevent transmitter 206 from damaging antennas 102-104 during the switch. Next, driver 204 may perform the switch by using a physical switch 212 connected to antennas 102-104 to disconnect the first antenna from the portable electronic device and connect the second antenna to the portable electronic device. Driver 204 may then turn transmitter 206 back on to resume transmission of the signal to the cellular receiver.

Immediately before or after transmitter 206 is turned back on, driver 204 may load a set of RF calibration values 208 for the second antenna. RF calibration values 208 may be used to account for differences in path loss between the two antennas 102-104. For example, RF calibration values 208 may include a frequency offset, a transmitter gain index versus power, and/or a power detector value versus power for each antenna 102-104.

In addition, RF calibration values 208 may be set prior to use of the portable electronic device. For example, a measurement and calibration process may be performed during manufacturing of the portable electronic device to identify the differences between the states and/or characteristics of RF components in the portable electronic device and ideal values for the RF components. The differences may then be stored as RF calibration values 208 in a table on the portable electronic device for subsequent retrieval during use of the portable electronic device by a user.

Driver 204 may then use RF calibration values 208 to operate the second antenna after the switch. In particular, driver 204 may select one or more values from the table for use in operating the second antenna based on the external environment of the portable electronic device and/or the state of transmitter 206 and/or other components in the portable electronic device. For example, driver 204 may detect that transmitter 206 is in a high gain mode after the switch is made and use a high gain mode offset from RF calibration values 208 to operate the second antenna.

Driver 204 may also set a maximum power 210 for the second antenna and use maximum power 210 to operate the second antenna before or after transmitter 206 is powered back on. For example, the steps of turning on transmitter 206, loading RF calibration values 208, and setting maximum power 210 may be shuffled as long as driver 204 is configured to perform the steps quickly.

Furthermore, driver 204 may set maximum power 210 based on a number of factors. First, maximum power 210 may be based on a regulatory requirement for the second antenna. For example, a regulatory organization such as the Federal Communications Commission (FCC) of the United States may specify different values of maximum power 210 for antennas 102-104 based on the sizes of antennas 102-104 and/or the proximity of antennas 102-104 to the user's head. As a result, driver 204 may update the value of maximum power 210 to the regulatory limit for the second antenna to cap the power of the second antenna at the regulatory limit.

Second, maximum power 210 may be limited by the operation of a third antenna (not shown) in the portable electronic device. For example, driver 204 may reduce maximum power 210 upon detecting the operation of a WiFi antenna in the portable electronic device within certain frequency bands to prevent interference between the second antenna and the WiFi antenna.

Third, maximum power 210 may be based on the temperature of the portable electronic device. For example, a closed-loop thermal management (CLTM) module may limit and/or manage the temperatures of the second antenna and/or other components in the portable electronic device by periodically transmitting requests for changes to maximum power 210 to driver 204.

Finally, maximum power 210 may be updated based on the proximity of the user to the second antenna. For example, the portable electronic device may include a proximity sensor for the second antenna. If the proximity sensor detects that a part of the user is near the second antenna, driver 204 may reduce maximum power 210 to comply with additional regulatory requirements associated with operating portable electronic device antennas close to users. Conversely, if the proximity sensor does not detect that the user is close to the second antenna, driver 204 may not modify maximum power 210.

By loading and/or using RF calibration values 208 for antennas 102-104, driver 204 may account for differences in the RF characteristics of antennas 102-104 and, in turn, maintain the integrity of the portable electronic device's connection with the cellular tower during switches between antennas 102-104. Furthermore, driver 204 may facilitate the safe, efficient, and/or reliable use of the portable electronic device by setting and/or updating maximum power 210 based on regulatory requirements, other antennas in the portable electronic device, temperatures, and/or the user's proximity to the portable electronic device.

Figure 3:
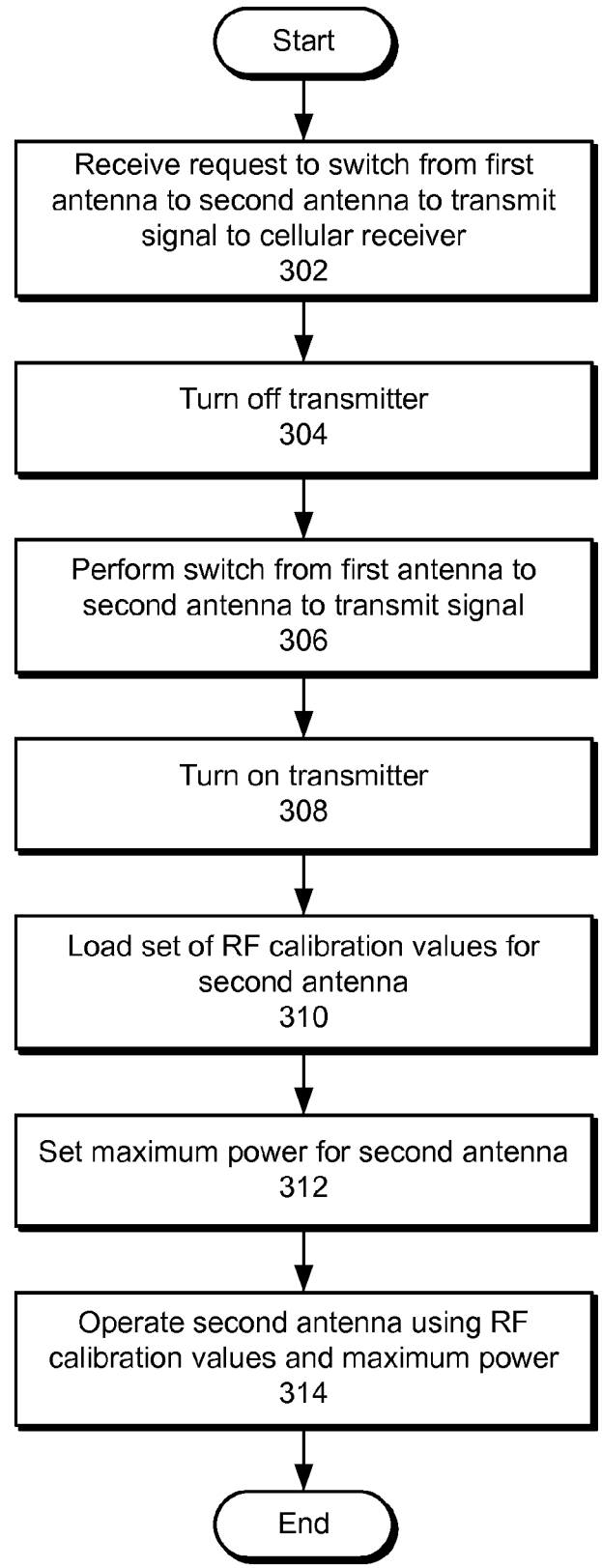
FIG. 3 shows a flowchart illustrating the process of using a first antenna and a second antenna in a portable electronic device in accordance with the disclosed embodiments.

FIG. 3 shows a flowchart illustrating the process of using a first antenna and a second antenna in a portable electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a request is received to switch from the first antenna to the second antenna to transmit a signal to a cellular receiver (operation 302). The request may be made upon detecting degradation in the efficiency of the first antenna (e.g., as a result of a change in the external environment of the portable electronic device). Next, a transmitter for the first and second antennas is turned off (operation 304) to prevent the transmitter from damaging the antennas during the switch. The switch from the first antenna to the second antenna to transmit the signal is then performed (operation 306), and the transmitter is turned back on (operation 308).

A set of RF calibration values for the second antenna is also loaded (operation 310). The RF calibration values may account for differences in path loss between the two antennas and include a frequency offset, a transmitter gain index versus power, and/or a power detector value versus power. In addition, a maximum power is set for the second antenna (operation 312). The maximum power may be based on a regulatory requirement for the second antenna, the operation of a third antenna in the portable electronic device, the temperature of the portable electronic device, and/or the proximity of a user to the second antenna.

Finally, the second antenna is operated using the RF calibration values and the maximum power (operation 314). For example, the frequency offset, transmitter gain index versus power, and/or power detector value versus power from the RF calibration values may be loaded into memory on the portable electronic device and used to configure the operation of the second antenna. Along the same lines, the power of the second antenna may be capped at the maximum power to facilitate the safe, efficient, and/or reliable operation of the portable electronic device.

Figure 4:
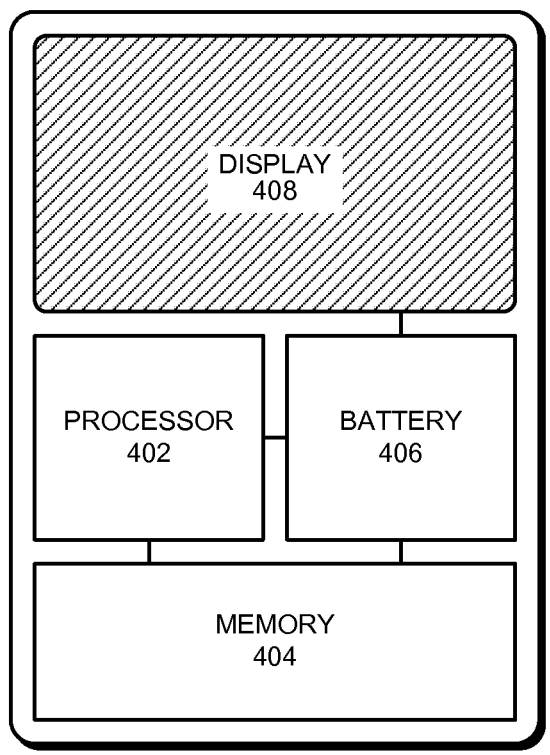
FIG. 4 shows a portable electronic device in accordance with the disclosed embodiments.

The above-described switching mechanisms can generally be used in any type of electronic device. For example, FIG. 4 illustrates a portable electronic device 400 which includes a processor 402, a memory 404 and a display 408, which are all powered by a battery 406. Portable electronic device 400 may correspond to a laptop computer, mobile phone, PDA, tablet computer, portable media player, and/or other type of battery-powered electronic device with cellular networking capabilities. To provide such cellular networking capabilities, portable electronic device 400 may include a first antenna and a second antenna for transmitting a signal to a cellular receiver.

Portable electronic device 400 may also include a driver (e.g., driver 204 of FIG. 2) that receives a request to switch from the first antenna to the second antenna to transmit a signal to a cellular receiver. In response to the request, the driver may load a set of RF calibration values for the second antenna and set a maximum power for the second antenna. Portable electronic device 400 may also include a switching mechanism (e.g., switch 212 of FIG. 2) that performs the switch from the first antenna to the second antenna to transmit the signal. The driver may then operate the second antenna using the RF calibration values and/or maximum power after the switch.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for using a first antenna and a second antenna in a portable electronic device, comprising:
   receiving a request to switch from the first antenna to the second antenna to transmit a signal to a cellular receiver;
   loading a set of radio-frequency (RF) calibration values for the second antenna; and
   performing the switch from the first antenna to the second antenna to transmit the signal, wherein the second antenna is operated using the RF calibration values after the switch.

2. The method of claim 1, further comprising:
   setting a maximum power for the second antenna, wherein the second antenna is further operated using the maximum power after the switch.

3. The method of claim 2, wherein the maximum power is set based on at least one of:
   a regulatory requirement for the second antenna;
   an operation of a third antenna in the portable electronic device;
   a temperature of the portable electronic device; and
   a proximity of a user to the second antenna.

4. The method of claim 1, further comprising:
   turning off a transmitter for the first and second antennas prior to performing the switch; and
   turning on the transmitter after the switch is performed.

5. The method of claim 1, wherein the set of RF calibration values comprises at least one of a frequency offset, a transmitter gain index versus power, and a power detector value versus power.

6. The method of claim 1, wherein the first and second antennas comprise a primary antenna and a secondary antenna.

7. The method of claim 1, wherein the portable electronic device is at least one of a mobile phone and a tablet computer.

8. A system for using a first antenna and a second antenna in a portable electronic device, comprising:
   a driver configured to:
   receive a request to switch from the first antenna to the second antenna to transmit a signal to a cellular receiver; and
   load a set of radio-frequency (RF) calibration values for the second antenna; and
   a switching mechanism configured to perform the switch from the first antenna to the second antenna to transmit the signal, wherein the second antenna is operated using the RF calibration values after the switch.

9. The system of claim 8, wherein the driver is further configured to:
   set a maximum power for the second antenna, wherein the second antenna is further operated using the maximum power after the switch.

10. The system of claim 9, wherein the maximum power is set based on at least one of:
    a regulatory requirement for the second antenna;
    an operation of a third antenna in the portable electronic device;

a temperature of the portable electronic device; and
a proximity of a user to the second antenna.

11. The system of claim 8, wherein the driver is further configured to:
   turn off a transmitter for the first and second antennas prior to performing the switch; and
   turn on the transmitter after the switch is performed.

12. The system of claim 8, wherein the set of RF calibration values comprises at least one of a frequency offset, a transmitter gain index versus power, and a power detector value versus power.

13. The system of claim 8, wherein the first and second antennas comprise a primary antenna and a secondary antenna.

14. The system of claim 8, wherein the portable electronic device is at least one of a mobile phone and a tablet computer.

15. A non transitory computer-readable storage medium storing instructions that when executed by a computer cause the computer to perform a method for using a first antenna and a second antenna in a portable electronic device, the method comprising:
   receiving a request to switch from the first antenna to the second antenna to transmit a signal to a cellular receiver;
   loading a set of radio-frequency (RF) calibration values for the second antenna; and
   performing the switch from the first antenna to the second antenna to transmit the signal, wherein the second antenna is operated using the RF calibration values after the switch.

16. The computer-readable storage medium of claim 15, the method further comprising:
   setting a maximum power for the second antenna, wherein the second antenna is further operated using the maximum power after the switch.

17. The computer-readable storage medium of claim 16, wherein the maximum power is set based on at least one of:
   a regulatory requirement for the second antenna;
   an operation of a third antenna in the portable electronic device;
   a temperature of the portable electronic device; and
   a proximity of a user to the second antenna.

18. The computer-readable storage medium of claim 15, the method further comprising:
   turning off a transmitter for the first and second antennas prior to performing the switch; and
   turning on the transmitter after the switch is performed.

19. The computer-readable storage medium of claim 15, wherein the set of RF calibration values comprises at least one of a frequency offset, a transmitter gain index versus power, and a power detector value versus power.

20. The computer-readable storage medium of claim 15, wherein the first and second antennas comprise a primary antenna and a secondary antenna.

21. The computer-readable storage medium of claim 15, wherein the portable electronic device is at least one of a mobile phone and a tablet computer.

22. A portable electronic device, comprising:
   a first antenna;
   a second antenna;
   a transmitter for the first and second antennas;
   a driver configured to:
   receive a request to switch from the first antenna to the second antenna to transmit a signal to a cellular receiver;
   load a set of radio-frequency (RF) calibration values for the second antenna; and
   set a maximum power for the second antenna; and
   a switching mechanism configured to perform the switch from the first antenna to the second antenna to transmit the signal, wherein the RF calibration values and the maximum power are used to operate the second antenna after the switch.

23. The portable electronic device of claim 22, wherein the driver is further configured to:
   turn off the transmitter prior to performing the switch; and
   turn on the transmitter after the switch is performed.

24. The portable electronic device of claim 22, wherein the set of RF calibration values comprises at least one of a frequency offset, a transmitter gain index versus power, and a power detector value versus power.

25. The portable electronic device of claim 22, wherein the maximum power is set based on at least one of:
   a regulatory requirement for the second antenna;
   an operation of a third antenna in the portable electronic device;
   a temperature of the portable electronic device; and
   a proximity of a user to the second antenna.

* * * * *